United States Patent
Modave et al.

(10) Patent No.: US 7,822,953 B2
(45) Date of Patent: Oct. 26, 2010

(54) PROTECTION OF A PROGRAM AGAINST A TRAP

(75) Inventors: Jean-Louis Modave, Ottignies (BE); Thierry Huque, Ramillies (BE)

(73) Assignee: Proton World International N.V., Zaventem (BE)

( * ) Notice: Subject to any disclaimer, the term of this patent is extended or adjusted under 35 U.S.C. 154(b) by 213 days.

(21) Appl. No.: 11/717,225

(22) Filed: Mar. 13, 2007

(65) Prior Publication Data

US 2007/0220612 A1   Sep. 20, 2007

(30) Foreign Application Priority Data

Mar. 14, 2006   (FR)   .................................. 06 50861

(51) Int. Cl.
 *G06F 7/04* (2006.01)
(52) U.S. Cl. .................. 712/220; 726/26; 714/E11.207
(58) Field of Classification Search ................ 712/220; 714/E11.207; 726/26
 See application file for complete search history.

(56) References Cited

U.S. PATENT DOCUMENTS

| | | | | |
|---|---|---|---|---|
| 4,525,599 A * | 6/1985 | Curran et al. | ................ | 713/190 |
| 4,823,307 A * | 4/1989 | Melgara et al. | ................ | 714/50 |
| 4,866,599 A * | 9/1989 | Morganti et al. | ............... | 726/17 |
| 5,170,401 A * | 12/1992 | Mohr | ......................... | 714/820 |
| 5,956,481 A * | 9/1999 | Walsh et al. | ................... | 726/23 |
| 6,041,180 A * | 3/2000 | Perks et al. | ................... | 717/151 |
| 6,108,340 A * | 8/2000 | Rolfe et al. | ................... | 370/406 |
| 6,282,645 B1 * | 8/2001 | Yamaki | ...................... | 713/100 |
| 7,434,068 B2 * | 10/2008 | Nguyen et al. | .............. | 713/193 |
| 2003/0217286 A1 * | 11/2003 | Carmona et al. | ............ | 713/200 |
| 2004/0015767 A1 * | 1/2004 | Futagi et al. | ................. | 714/758 |
| 2005/0033982 A1 * | 2/2005 | Paaske | ........................ | 713/200 |
| 2005/0210284 A1 * | 9/2005 | Catherwood | ................. | 713/200 |
| 2006/0156005 A1 * | 7/2006 | Fischer et al. | ................ | 713/176 |
| 2007/0192854 A1 * | 8/2007 | Kelley et al. | ................... | 726/22 |
| 2008/0022381 A1 * | 1/2008 | Le Saint | ........................ | 726/9 |

OTHER PUBLICATIONS

French Search Report from French Patent Application 06/50861, filed Mar. 14, 2006.
Litchfield K.P. "Instruction Execution Sequence Confirmation" Jun. 1, 1994, Computer Architecture News, ACM, New York, NY, US, pp. 14-18, XP000460596 ISSN: 0163-5964.
Yung-Yuan Chen et al.: "Incorporating signature-monitoring technique in VLIW processors" Defect and Fault Tolerance in VLSI Systems, 2004. DFT 2004. Proceedings. 19th IEEE International Symposium on Cannes, France Oct. 10-13, 2004, Piscataway, NJ, USA, IEEE, Oct. 10, 2004, pp. 395-402, XP010736673 ISBN: 0-7695-2241-6.

* cited by examiner

*Primary Examiner*—Eddie P Chan
*Assistant Examiner*—Idriss N Alrobaye
(74) *Attorney, Agent, or Firm*—Lisa K. Jorgenson; William R. McClellan; Wolf, Greenfield & Sacks, P.C.

(57) ABSTRACT

A method for controlling the execution, by a central processing unit, of a program stored in a memory, a redundancy code stored with first current data at a current address being assigned to second subsequent data of the program and depending at least on the second data.

8 Claims, 3 Drawing Sheets

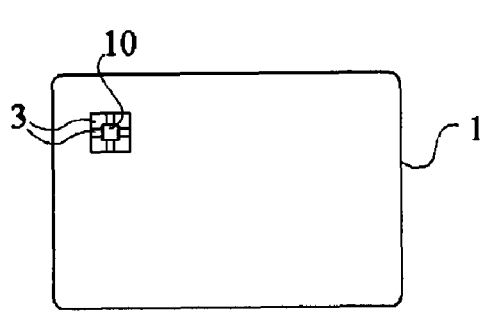
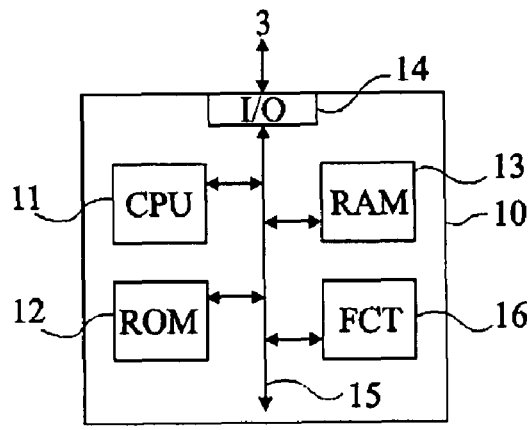
Fig 1
Fig 2
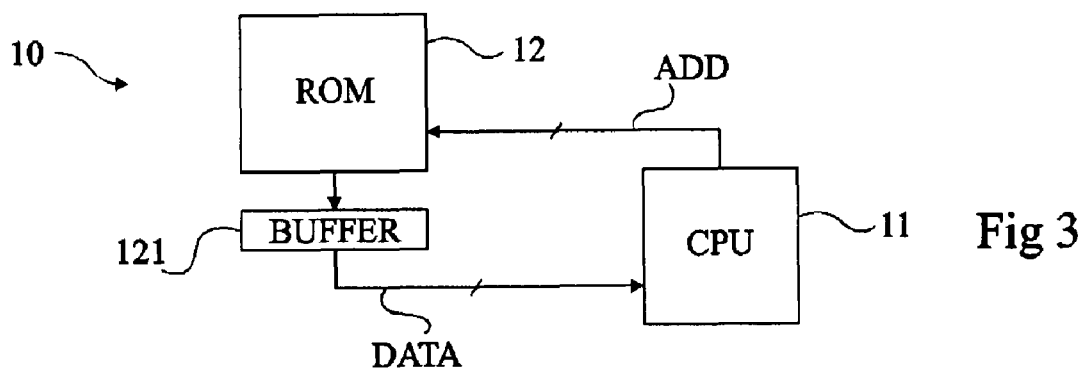
Fig 3
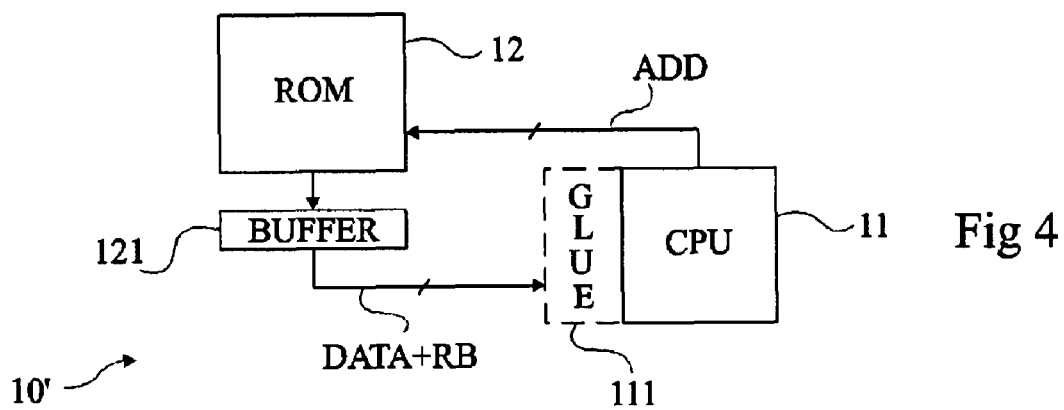
Fig 4

PROTECTION OF A PROGRAM AGAINST A TRAP

BACKGROUND OF THE INVENTION

1. Field of the Invention

The present invention generally relates to electronic circuits and, more specifically, to the checking of the integrity of programs on execution thereof by a circuit.

An example of application of the present invention relates to smart cards.

2. Discussion of the Related Art

FIG. 1 very schematically shows an example of a smart card 1 of the type to which the present invention applies. An integrated circuit chip 10 is inserted into plastic card 1 and is connected to electric contacts 3 for communication with a card reader, not shown. The card may also be provided with a contactless communication system (electromagnetic transponder).

FIG. 2 is a schematic block diagram illustrating components of an integrated circuit 10 of a smart card 1 of FIG. 1. Circuit or chip 10 comprises a central processing unit 11 (CPU), one or several non-volatile memory elements 12 (for example, of ROM type), one or several volatile storage elements 13 (for example, of RAM type). The different components of chip 10 communicate together and with an input/output device 14 (I/O) connected to contacts 3 by one or several data, address, and control buses 15. Most often, chip 10 comprises other functions 16 (FCT) formed for example of circuits performing cryptographic operations.

The programs stored, for example, in memory 12, are capable of being disturbed on execution thereof (trapped), be it incidentally or deliberately (hacking attempts).

Among attacks performed by hackers to obtain confidential data from chip 10, the present invention applies to so-called differential fault analysis attacks (DFA) which disturb the operation of circuit 10 for example by means of a radiation (laser, infrared, X-rays, etc.) or by any other means (for example, by acting on the component power supply). On execution of a program by central processing unit 11, a program trap (voluntary or incidental) may result in skipping one or several instructions of a cryptographic calculation, of an authenticity checking, of an integrity checking, etc.

FIG. 3 shows a detail of FIG. 2 illustrating the operation of central processing unit 11 in relation with a program contained, for example, in ROM 12. Central processing unit 11 sends an address ADD to memory 12 to extract therefrom instructions DATA of a program, as well as possible arguments of these instructions for execution. Generally, an amplifier 121 forming a buffer memory element (BUFFER) is present at the data output of memory 12 to temporarily store the instructions intended for the central processing unit. The presence of amplifier 121 is a weakness in terms of protection of the system against possible program trap attempts. Indeed, if the content of a non-volatile memory can be considered as secure since it is difficult to modify (especially in the case of a ROM set on manufacturing), the transfer of data (instructions and arguments) to central processing unit 11 for execution is a critical step since the data may be modified by of disturbing the buffer element (amplifier 121).

For example, a disturbance may result in having the opcode switch from 00 to FF in hexadecimal notation. Most of the time, such opcodes correspond to specific instructions. For example, in certain processors, a code 00 corresponds to a jump conditioned by the next argument. If the instruction extracted from the memory is an instruction for loading data to a specific address, the transformation of this instruction into 00 causes a jump, taking the arguments into account. According to another example, code FF corresponds to a load instruction based on the next arguments. A disturbance resulting in a code FF then transforms any instruction into a load instruction using the arguments. According to other examples, codes 00 and FF result in displacements of characters or other specific instructions.

In all cases, an undesired effect which most often generates a trap in the program is obtained.

The same type of disturbance is also disturbing if the instruction is present in a non-volatile memory, and more generally as soon as it is present in a storage element and/or between a memory plane, volatile or not, and an execution unit.

A solution would be to avoid opcodes 00 and FF on constitution of the programs. However, this would only transfer the problem to other possible opcodes. Indeed, although codes 00 and FF are the most easily obtained by a disturbance of amplifier 121, any other state modified with respect to the code read from the memory is likely to generate a program trap.

Mechanisms for checking the integrity of an executed code which execute a same program twice and check the matching between the obtained results at the end of the two executions are also known. A disadvantage is that such mechanisms act ex post facto and that there then remains a non-negligible risk for the hacker to have been able to exploit, during the trap, an erroneous result of the program.

Other countermeasures to trap attempts comprise calculating a signature based on executed program instructions to compare it with a reference signature calculated at the program storage. Here again, it is a mechanism ex post facto, the signature being only obtained at the end of the execution.

SUMMARY OF THE INVENTION

The present invention aims at overcoming all or part of the disadvantages of known techniques forming countermeasures to trap attempts on programs executed by an electronic circuit.

The present invention more specifically aims at a solution protecting the content of one or several instructions contained in a memory and/or in peripheral components thereof, for example, a buffer amplifier after extraction from a non-volatile memory.

The present invention also aims at a solution compatible with the other known countermeasures against trap attempts.

The present invention also aims at a solution which does not notably delay the program execution.

To achieve all or part of these objects, as well as others, the present invention provides a method for controlling the execution, by a central processing unit, of a program stored in a memory, a redundancy code stored with first current data at a current address being assigned to second subsequent data of the program and depending at least on the second data.

According to an embodiment of the present invention, the redundancy code, assigned to current data and stored with preceding data, depends on the current data and on preceding data.

According to an embodiment of the present invention, a code stored with preceding data is compared with a current code, calculated with the current data.

According to an embodiment of the present invention, the execution of a current instruction is conditioned by the identity between the current code and the code stored on reading of preceding data.

According to an embodiment of the present invention, said code is a CRC-type code.

The present invention also provides a method for storing a program in a memory, comprising a step of storing at a current address an instruction or an instruction argument, accompanied by a code calculated based on the content of a next address in the program execution.

According to an embodiment of the present invention, the beginning of the program or of a sub-program is an instruction for initializing the redundancy codes.

The present invention also provides an electronic circuit for executing a program and a smart card comprising such a circuit.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 1, previously described, shows an example of a smart card of the type to which the present invention applies;

FIG. 2, previously described, partially and schematically shows an example of an electronic circuit of the type to which the present invention applies;

FIG. 3, previously described, shows a detail of the circuit of FIG. 2;

FIG. 4 is a schematic block diagram illustrating a portion of an electronic circuit according to an embodiment of the present invention;

DETAILED DESCRIPTION

Figures 5, 6:
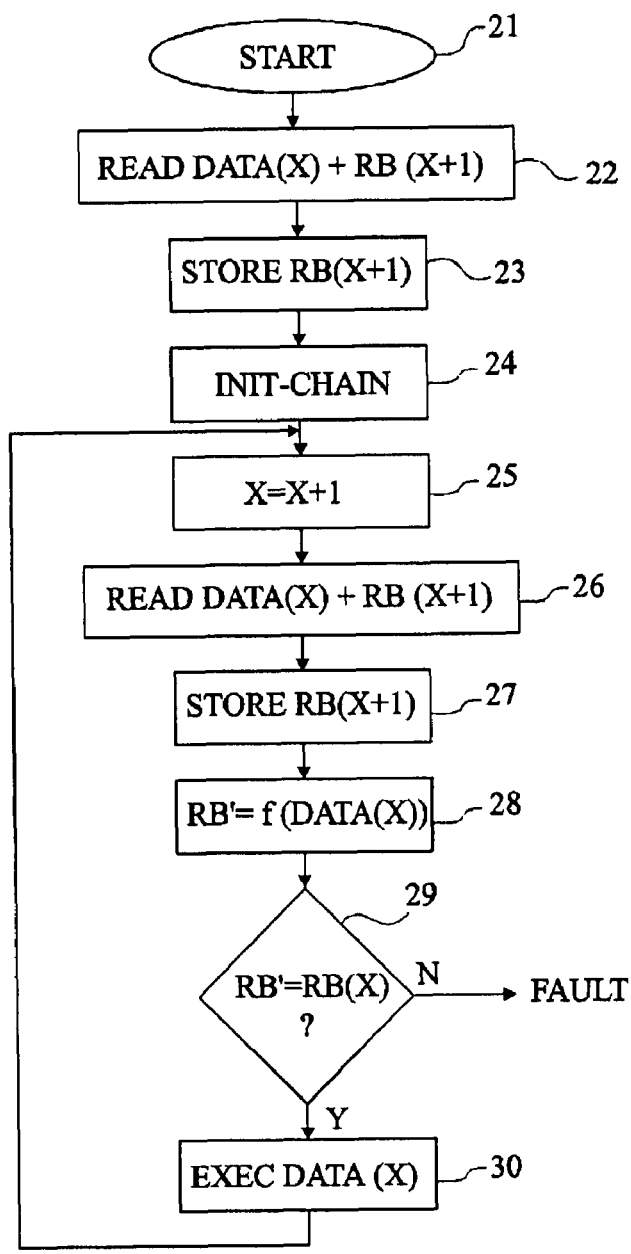
FIG. 5 shows an example of the data content stored in the non-volatile memory, illustrating a first embodiment of the present invention.
FIG. 6 is a flowchart illustrating the first embodiment of the present invention.

The same elements have been designated with the same reference numerals in the different drawings. For clarity, only those elements and steps which are useful to the understanding of the present invention have been shown and will be described. In particular, the details of the instructions executed by the programs modified by the implementation of the present invention have not been discussed, the present invention applying to any conventional instruction.

The present invention will be described with the example of a program contained in a non-volatile memory and capable of being disturbed in a buffer amplifier at the output of this memory. It, however, more generally applies whether the memory is volatile or not, and whatever the element sensitive to a disturbance between the memory and the instruction execution unit.

A feature of an embodiment of the present invention is to store, with the instructions and instruction arguments of a program, a control code, called redundancy code, over one or several bits which depends on the instruction or on the argument which follows in the normal program execution. A code calculated before execution of an instruction is compared for verification with the code read from the memory during the preceding instruction or argument.

FIG. 4 schematically shows, in a view to be compared with that of FIG. 3, a portion of an electronic circuit according to an embodiment of the present invention.

As previously (FIG. 2), electronic circuit 10' comprises a central processing unit, one or several RAMs, one or several non-volatile memories, possibly other functions, all these elements communicating over one or several buses together and if need be with the outside of the circuit. For simplification, only central processing unit 11 (CPU) and non-volatile memory 12 (ROM) associated with its output amplifier 121 (BUFFER) have been shown in FIG. 4. The central processing unit organizes the extraction of program lines stored in memory 12 by sending thereto the successive addresses containing the desired instructions and arguments. The corresponding data (instructions and arguments) are extracted from memory 12 and are temporarily stored in amplifier 121.

According to an embodiment of the present invention, the data in the non-volatile memory concerning instructions or instruction arguments of a program are completed with a control code (of CRC or signature type) over a number of so-called redundancy bits smaller than the number of bits of the actual data. For example, for bytes coded in hexadecimal notation, two complementary bits are provided for a CRC calculation. Data DATA and redundancy bits RB are extracted from memory 12 to be processed by central processing unit 11. In the embodiment of FIG. 4, a logic circuit 111 (GLUE) preprocesses the data and the redundancy bits. As a variation, this processing is directly performed by central processing unit 11.

FIG. 5 shows a partial example of a program implementing the present invention. A first column in FIG. 5 shows address ADD in the non-volatile memory of data DATA and of the redundancy bits present at this address. Of course, the address can be converted from a virtual address provided by central processing unit 11 to a physical address in memory 12. For simplification, the case where the two virtual and physical addresses are identical will be considered. A second column represents data DATA, that is, the instruction or its argument, present in memory 12 at the concerned address, and a third column represents the redundancy bits RB present at this address.

According to this embodiment of the present invention, the redundancy bits provided at a given address of a program are calculated from the data of the next address in the program sequencing. In the example shown in FIG. 5, it is assumed that successive addresses X to X+6 contain data, respectively INIT-CHAIN, INST1, ARG1.1, and ARG1.2 representing the arguments of the first instruction, INST2, ARG2.1 representing the single argument of the second instruction, INST3, etc. In this example, the respective redundancy bits of addresses X to X+5 are calculated based on data INST1, ARG1.1, ARG1.2, INST2, ARG2.1, and INST3.

FIG. 5 shows that for first instruction INST1 of a program or sub-program to be protected by the implementation of the present invention, a first specific instruction INIT-CHAIN (for example, an instruction OP performing no operation), having its associated redundancy bits concerning those of the next instruction (the first effective instruction) and enabling starting a redundancy chain, is provided.

An advantage of calculating the redundancy bits or more generally any signature according to one or several next instructions of the program is that the redundancy then links all the instructions together. This enables checking not only that the actual instruction has not been modified, but also that the program sequencing is effectively respected.

FIG. 6 is a flowchart illustrating the embodiment of the present invention of FIG. 5. At each beginning of a program or sub-program (block 21, START), the central processing unit requires the reading from the non-volatile memory of address data X and of the redundancy bits stored at address X, but calculated from address instruction X+1 (block 22, READ DATA(X)+RB(X+1)). The central processing unit or associated logic circuit 111 temporarily stores (block 23, STORE RB(X+1)) the redundancy bits of the next instruction. Then, the instruction present at address X (block 24, INIT-CHAIN), for example, a no operation instruction, is executed.

The program counter associated with central processing unit 11 is incremented for the next instruction (possibly by taking into account a time shift to prepare the next instructions to be executed), which amounts to incrementing by one the program address (block 25, X=X+1).

The central processing unit then sends, to the non-volatile memory, address X+1 for reading the next instruction and the redundancy bits present at this address but concerning a subsequent instruction (block 26, READ DATA(X)+RB(X+1)). As at step 23, the central processing unit or the associated logic circuit stores the redundant bits intended for the subsequent instruction (block 27, STORE RB(X+1)). Then, the central processing unit calculates redundancy bits RB' from the instruction effectively received from amplifier 121 (block 28, RB'=f(DATA(X)). Function f represents the redundancy bit calculation function and must be known by both the electronic circuit executing the program and that causing its ROM recording (for example, function f is known by the developer).

The central processing unit then compares the current redundancy bits RB' with the redundancy bits RB(X) obtained on reading of the preceding instruction (block 29, RB'=RB(X)?). In case of an identity (output Y of block 29), the data present at address X are considered as valid and the corresponding in-struction is executed (block 30, EXEC DATA(X)) possibly after reception and verification of its arguments.

It is then returned to the input of block 25 for loading of the next program line and repeating of the same verification steps. In case of a difference between codes RB and RB' (output N of block 29), this means a fault, either in the sequencing, or in the executed instruction.

The fault processing can take any form. For example, this may result in a blocking of the circuit (possibly in case the number of faults considered as acceptable is exceeded), in the transmission of a fault signal, etc., the present invention being compatible with all the usual processings performed after a fault detection.

The order of steps 27 to 30 is of no importance, provided for step 29 to be performed after step 28.

The present invention takes advantage from the fact that the programs which are desired to be monitored are most often written into a non-volatile memory and are thus known in advance, including in their sequencing.

According to an alternative embodiment, the first chain initialization instruction, which is used to verify instruction INST1 of the program, is omitted. However, an advantage of providing this instruction is that this makes the solution compatible with a dynamic call to different sub-programs. Preferably, all the sub-programs then start with a same specific instruction INIT-CHAIN (for example, an instruction NOP) enabling starting another redundancy chain, and the calls to sub-programs comprise, as redundancy bits, the bits calculated for this start instruction. This allows for branchings on sub-programs without requiring to provide all the possible paths. Preferably, the possible return addresses in the main program (or in other sub-programs in case of a nesting) also comprise the start instruction so that the redundancy bits present at the addresses of the return instructions of all sub-programs can be identical, independently from the sub-programs. This simplifies the design and the checking.

Figures 7, 8:
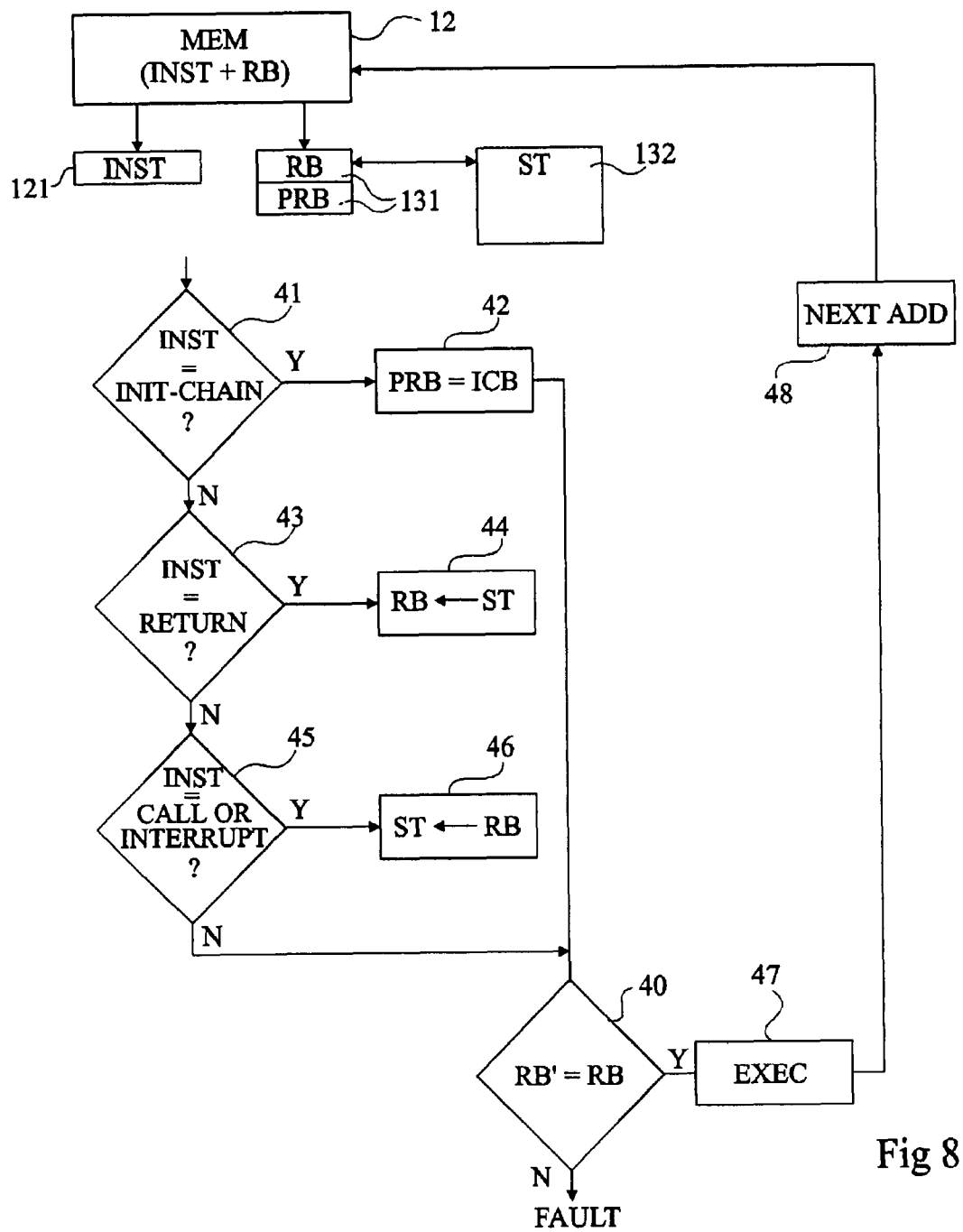
FIG. 7 shows an example of a partial content of a non-volatile memory illustrating a variation of the present invention.
FIG. 8 shows a simplified flowchart illustrating another variation of the present invention.

FIG. 7 illustrates a variation of the present invention according to which redundancy bits RB associated with the data are divided into at least two portions. A first portion contains the code of the next instruction. A second portion contains, in case of a conditional jump, the code of another instruction and a fixed code RB0 otherwise. In the shown example, it is assumed that the first effective instruction (address X+1) is a conditional jump (CONDJUMP(X+4,X+6)). This embodiment enables checking the sequencing and the integrity of the program, be the instruction following the first one instruction INST2 or instruction INST3. Fixed code RB0 is used to complete the redundancy bits in the absence of a jump.

The two previously-illustrated embodiments require for all the paths possible for the program to be pre-calculated, except for the possible calls to sub-programs.

FIG. 8 is a simplified flowchart illustrating another variation, particularly well adapted to the case where the return after a call to a sub-program is likely to occur at a conditional address that cannot be determined by the call to this sub-program, the redundancy word being then calculated from the next instruction at the return to the main program.

The program is contained in a memory, for example, memory 12 having its addresses ADD containing the instructions and arguments, and the redundancy bits. For simplification, it is assumed that each address contains an instruction INST and a redundancy bit. According to this embodiment, two elements (block 131) of buffering of at least two redundancy bits or groups of bits RB and PRB are updated according to the possible instructions and branchings. With the notations of FIG. 8, bits RB are the bits stored at the address of the current instruction to protect the next instruction. In normal operation (inside a program or sub-program), redundancy bits RB', calculated for the current instruction, are compared (test 40, RB'=PRB ?) with the bits PRB contained in element 131 as associated with the previous instruction. The instruction is only executed (block 47, EXEC) in case of a matching, a fault (FAULT) being generated otherwise. After each instruction, the next address (block 48, NEXT ADD) is selected to be extracted from memory 12.

For each new program instruction and before comparing redundancy bits RB' calculated with this current instruction with bits PRB stored during a previous instruction, several tests are performed for, if necessary, reorganizing the contents of elements 131.

If (test 41, INST=INIT-CHAIN ?), the current instruction is a chain initialization, the redundancy bits IRB corresponding to this type of instruction (for example, a NOP) are stored (block 42, PRB=ICB). The redundancy bits read with instruction INIT-CHAIN (and corresponding to the first instruction of the sub-program) are stored as element RB.

If (test 43, INST=RETURN) the instruction is an instruction for returning to a calling program or an interrupt return, redundancy bits stored in an additional memorization element 132 ST (or a stack of registers) when the sub-program is called replace (block 44, RB←ST) redundancy bits RB.

If (test 45, INST=CALL OR INTERRUPT ?) the instruction is a call to a sub-program or an interrupt, the redundancy bits read with this instruction are placed (block 46, ST←RB) in stack 132.

Thus, in the call of a sub-program by a first program or an interrupt, the redundancy bits which will be used, at the return (or at the end of an interrupt) to the next instruction of the first program, are stored. At the beginning of the sub-program, the specific redundancy bits of the starting instruction are taken as bit PRB for the next instruction. At the end of the sub-program, the bits stored at the call of this sub-program are loaded back as bits to be taken into account for the instruction following the return.

An advantage of the present invention is the control not only of the contents of the actual instructions, but also of the program sequencing by constructing a trust/redundancy chain.

Another advantage of the present invention is that its implementation and especially the checking of the redundancy codes uses simple functions generally present in the central processing units, be it in wired form or not, and takes but little time as compared with the actual program execution time.

Of course, the present invention is likely to have various alterations, improvements, and modifications which will readily occur to those skilled in the art. In particular, although the present invention has been described in relation with an example more specifically intended for ROMs, it more generally applies to volatile or non-volatile memories, rewritable or not. In the case of updating programs stored in a rewritable non-volatile memory (for example, of EEPROM type), it will be ascertained to construct the updating program by taking into account the redundancy bits of the instructions of the main program. Such a precaution generally raises no problem since the designer of the updating program knows all of the main program. Further, although the present invention has been described in relation with an example of application to smart cards, it more generally applies to any electronic circuit of execution of a program, be the program storage memory integrated or not to the central processing unit. Further, the redundancy code stored with current data (instruction or instruction argument) can be calculated by taking into account not only the next data (instruction or argument) but also the current data.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for checking integrity of program execution by a circuit, comprising:
    storing each instruction and instruction argument of a program as data at a memory location in a memory, the memory location identified by a memory address;
    storing in the memory, with each instruction and instruction argument of the program, a redundancy code which is calculated from a next instruction or instruction argument in a program sequence;
    reading from the memory a current instruction or instruction argument of the program;
    calculating a current redundancy code from the current instruction or instruction argument read from the memory;
    comparing the current redundancy code with a stored redundancy code stored with a previous instruction or instruction argument of the program;
    generating a fault indication if the current redundancy code does not match the stored redundancy code, wherein the redundancy code enables checking that both the instruction or instruction argument and the program sequence have not been modified; and
    storing in the memory an initialization instruction with a redundancy code which is a function of a first instruction of the program; and wherein the stored redundancy code further includes a code which is a function of another instruction that is a target of a conditional jump instruction in the program.

2. A method as defined in claim 1, further comprising proceeding with execution of the program if the current redundancy code matches the stored redundancy code.

3. A method as defined in claim 1, wherein the redundancy code is a cyclic redundancy check (CRC) code.

4. An electronic circuit for executing a program, comprising:
    a memory to store each instruction and instruction argument of the program as data at a memory location in the memory, each memory location identified by a memory address, and to store with each instruction and instruction argument a redundancy code which is calculated from a next instruction or instruction argument in a program sequence; and
    a processing unit to receive the instructions and instruction arguments of the program and the redundancy codes from the memory, the processing unit configured to:
    read from the memory a current instruction or instruction argument of the program;
    calculate a current redundancy code from the current instruction or instruction argument read from the memory;
    compare the current redundancy code with a stored redundancy code stored with a previous instruction or instruction argument of the program;
    generate a fault indication if the current redundancy code does not match the stored redundancy code, wherein the redundancy code enables checking that both the instruction or instruction argument and the program sequence have not been modified; and
    wherein the memory stores an initialization instruction with a redundancy code which is a function of a first instruction in the program; and wherein the stored redundancy code further includes a code which is a function of another instruction that is a target of a conditional jump instruction in the program.

5. A smart card comprising the electronic circuit of claim 4.

6. An electronic circuit as defined in claim 4, further comprising a buffer coupled between an output of the memory and an input of the processing unit.

7. An electronic circuit as defined in claim 4, wherein the processing unit is configured to continue execution of the program if the current redundancy code matches the stored redundancy code.

8. An electronic circuit as defined in claim 4 wherein the memory is configured to store a redundancy code comprising a cyclic redundancy check (CRC) code.

* * * * *